US012782747B2

(12) United States Patent
Gene et al.

(10) Patent No.: US 12,782,747 B2
(45) Date of Patent: Nov. 3, 2026

(54) OPTICAL ARTIFICIAL NEURAL NETWORK SYSTEM

(71) Applicant: ELECTRONICS AND TELECOMMUNICATIONS RESEARCH INSTITUTE, Daejeon (KR)

(72) Inventors: Jin Hwa Gene, Daejeon (KR); Suntak Park, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 950 days.

(21) Appl. No.: 18/098,339

(22) Filed: Jan. 18, 2023

(65) Prior Publication Data

US 2023/0385626 A1 Nov. 30, 2023

(30) Foreign Application Priority Data

May 24, 2022 (KR) ........................ 10-2022-0063662
Dec. 9, 2022 (KR) ........................ 10-2022-0171151

(51) Int. Cl.
*G02B 27/18* (2006.01)
*G02B 27/28* (2006.01)
*G06N 3/067* (2006.01)

(52) U.S. Cl.
CPC ........... *G02B 27/18* (2013.01); *G02B 27/281* (2013.01); *G02B 27/283* (2013.01); *G06N 3/067* (2013.01)

(58) Field of Classification Search
CPC ..... G06N 3/067; G02B 27/281; G02B 27/283
See application file for complete search history.

(56) References Cited

U.S. PATENT DOCUMENTS 5,073,006 A 12/1991 Horner et al.
6,080,994 A 6/2000 Carrott et al.
(Continued)

FOREIGN PATENT DOCUMENTS

JP 2007/508651 A 4/2007
JP 2021-051086 A 4/2021
(Continued)

OTHER PUBLICATIONS

J. Bueno et al., "Reinforcement Learning in a Large Scale Photonic Recurrent Neural Network", arXiv;1711.05133v2 [cs.NE] Nov. 15, 2017.

(Continued)

*Primary Examiner* — Stephone B Allen
*Assistant Examiner* — Tamara Y. Washington
(74) *Attorney, Agent, or Firm* — LRK PATENT LAW FIRM

(57) ABSTRACT

Disclosed is an optical artificial neural network system which includes a first spatial light modulator modulating an incident light to generate a first light having a first optical image, a concave mirror reflecting the first light to generate a second light having a second optical image, a first polarized beam splitter disposed between the first spatial light modulator and the concave mirror, a first quarter wave-plate disposed between the first spatial light modulator and the first polarized beam splitter, a second spatial light modulator generating a third light by modulating the second light reflected by the first polarized beam splitter so as to have a third optical image, a beam splitter disposed between the first spatial light modulator and the first polarized beam splitter, and an imaging device.

18 Claims, 12 Drawing Sheets

(56) References Cited

U.S. PATENT DOCUMENTS

| | | | | |
|---|---|---|---|---|
| 6,424,449 | B1 | 7/2002 | Namiki | |
| 7,411,708 | B2 | 8/2008 | Waldman et al. | |
| 7,864,333 | B1 | 1/2011 | Olczak et al. | |
| 9,857,472 | B2 | 1/2018 | Mheen et al. | |
| 10,365,218 | B2 | 7/2019 | Santori et al. | |
| 10,591,417 | B2 | 3/2020 | Santori et al. | |
| 11,120,332 | B2 | 9/2021 | Bowen et al. | |
| 11,694,071 | B2 | 7/2023 | Lee | |
| 2005/0201715 | A1* | 9/2005 | Ellwood | G02B 6/2746 385/147 |
| 2020/0400943 | A1* | 12/2020 | Kessler | G02B 27/283 |
| 2021/0093195 | A1* | 4/2021 | Preciado | G02F 1/137 |
| 2021/0123853 | A1* | 4/2021 | Li | G01N 15/1459 |
| 2021/0318467 | A1 | 10/2021 | Zhou et al. | |
| 2022/0291517 | A1 | 9/2022 | Piskunov et al. | |
| 2023/0385626 | A1 | 11/2023 | Gene et al. | |

FOREIGN PATENT DOCUMENTS

| | | | |
|---|---|---|---|
| KR | 10-2020-0092525 | A | 8/2020 |
| KR | 10-2021-0066685 | A | 6/2021 |
| KR | 10-2023-0163917 | A | 12/2023 |

OTHER PUBLICATIONS

Ying Zuo et al., “All Optical Neural Network With Nonlinear Activation Functions”, arXiv;1904.10819v1 [physics.optics] Apr. 24, 2019.

Jia Liu et al., “Research Progress in Optical Neural Networks”, PhotoniX (2021) 2:5.

Qiuhao Wu et al., “Multi-Layer Optical Fourier Neural Network Based on the Convolution Theorem”, AIP Advances 11, 055012 (2021).

Xiubao Sui et al., “A Review of Optical Neural Networks”, IEEE Access, vol. 8, 2020.

* cited by examiner

OPTICAL ARTIFICIAL NEURAL NETWORK SYSTEM

CROSS-REFERENCE TO RELATED APPLICATIONS

This application claims priority under 35 U.S.C. § 119 to Korean Patent Application Nos. 10-2022-0063662 filed on May 24, 2022, and 10-2022-0171151 filed on Dec. 9, 2022, in the Korean Intellectual Property Office, the disclosures of which are incorporated by reference herein in their entireties.

BACKGROUND

1. Field of the Invention

Embodiments of the present disclosure described herein relate to an artificial neural network, and more particularly, relate to an optical artificial neural network system.

2. Description of Related Art

A convolutional artificial neural network is a type of multilayer feed-forward artificial neural network for object recognition and image classification. The convolutional artificial neural network is widely used in fields, which require an image information processing system, such as autonomous driving and the Internet of Things. With the development of wireless communication technologies, the utilization of the convolutional artificial neural network is emerging even higher. As such, there exponentially increases the throughput of image information that is required as the amount of image data used in the system increases and image information becomes sophisticated more and more. However, the speed at which an existing electronic computer processes image information is slow compared to the increasing amount of information and is approaching the limit. In particular, there is an increasing demand for energy efficiency enhancement.

The convolutional artificial neural network includes a convolution layer, a pooling layer, a fully connected layer, etc. and outputs a final calculation result through the iteration of the operations. Nowadays, there is being researched a technology for increasing a computation speed and energy efficiency at the same time by optically performing calculation of the convolution layer that is one of parts requiring the greatest amount of computation.

SUMMARY

Embodiments of the present disclosure provide an optical artificial neural network system capable of being miniaturized.

Embodiments of the present disclosure provide an optical artificial neural network system with an improved optical characteristic.

According to an embodiment, an optical artificial neural network system includes a light insertion unit that receives an incident light, a first spatial light modulator that modulates the incident light received by the light insertion unit to generate a first light having a first optical image, a first light path adjustment device that transmits the first light, a second light path adjustment device that circularly polarizes the first light passing through the first light path adjustment device, a light Fourier transform device that reflects the first light circularly polarized, to generate a second light having a second optical image, and a second spatial light modulator that modulates the second light to generate a third light having a third optical image. The second light generated by the light Fourier transform device travels to the second spatial light modulator through the second light path adjustment device, and the third light generated by the second spatial light modulator travels to the light Fourier transform device through the second light path adjustment device. The light Fourier transform device reflects the third light to generate a fourth light having a fourth optical image, and the first light path adjustment device changes a light path of the fourth light.

In an embodiment, the light insertion unit includes a polarized beam splitter and a quarter wave-plate, the polarized beam splitter reflects a first direction component of the incident light toward the first spatial light modulator, and the quarter wave-plate circularly polarizes the first direction component of the first light reflected by the polarized beam splitter.

In an embodiment, the first light path adjustment device includes a Faraday rotator configured to rotate a polarization direction of a transmitted light by 45 degrees, and the fourth light passing through the Faraday rotator is reflected by the polarized beam splitter.

In an embodiment, the light insertion unit includes a digital micro-mirror device configured such that the second light is vertically reflected by the first spatial light modulator.

In an embodiment, the first light path adjustment device includes a beam splitter that reflects the fourth light to change the light path of the fourth light.

In an embodiment, the second light path adjustment device includes a polarized beam splitter and a quarter wave-plate, and the polarized beam splitter transmits a first direction component of the first light and reflects a second direction component of the first light. The quarter wave-plate circularly polarizes the first direction component of the first light passing through the polarized beam splitter.

In an embodiment, the light Fourier transform device includes a concave mirror.

In an embodiment, a distance between the concave mirror and the first spatial light modulator is determined in consideration of refractive indices of components included in the light insertion unit, the first light path adjustment device, and the second light path adjustment device disposed on a traveling path of the first light, such that a light path of the first light is identical to a focal length of the concave mirror.

In an embodiment, a distance between the second spatial light modulator and the second light path adjustment device is determined in consideration of refractive indices of components in the second light path adjustment device disposed on a traveling path of the second light, such that a light path of the second light is identical to the focal length of the concave mirror.

In an embodiment, the optical artificial neural network system further includes an imaging device that picks up the fourth light whose light path is changed by the first light path adjustment device.

In an embodiment, a distance between the imaging device and the first light path adjustment device is determined in consideration of refractive indices of components included in the first light path adjustment device and the second light path adjustment device disposed on a traveling path of the fourth light, such that the light path of the fourth light is identical to a focal length of the concave mirror.

According to an embodiment, an optical artificial neural network system includes a light insertion unit that receives an incident light, a first spatial light modulator that modulates the incident light received by the light insertion unit to generate a first light having a first optical image, a light Fourier transform device that transmits the first light to generate a second light having a second optical image, a second spatial light modulator that reflects the second light to generate a third light having a third optical image, and a first quarter wave-plate that is disposed between the light Fourier transform device and the second spatial light modulator, and the light Fourier transform device transmits the third light to generate a fourth light having a fourth optical image.

In an embodiment, the light insertion unit includes a polarized beam splitter and a second quarter wave-plate. The polarized beam splitter reflects a first direction component of the incident light toward the first spatial light modulator, and the second quarter wave-plate circularly polarizes the first direction component of the first light reflected by the polarized beam splitter.

In an embodiment, the light insertion unit includes a digital micro-mirror device configured such that the second light is vertically reflected by the first spatial light modulator.

In an embodiment, the light Fourier transform device includes a convex lens.

In an embodiment, a distance between the convex lens and the first spatial light modulator is determined in consideration of refractive indices of components included in the light insertion unit disposed on a traveling path of the first light, such that a light path of the first light is identical to a focal length of the convex lens.

In an embodiment, a distance between the convex lens and the second spatial light modulator is determined in consideration of a refractive index of the first quarter wave-plate disposed on a traveling path of the second light, such that a light path of the second light is identical to a focal length of the convex lens.

BRIEF DESCRIPTION OF THE DRAWINGS

The above and other objects and features of the present disclosure will become apparent by describing in detail embodiments thereof with reference to the accompanying drawings.

DETAILED DESCRIPTION

The terms used in the specification are provided only to describe specific embodiments, not to limit the claimed invention. As used herein, the singular forms "a" and "one" are intended to include the plural forms as well unless otherwise stated clearly on the context. As used herein, the terms "comprising" and/or "including" indicate the presence of specified features, elements, and/or components, but it may be further understood that they do not exclude one or more other features, elements, or components, and/or the presence or addition of groups thereof. As used herein, the terms "first", "second", etc. are used as labels of preceding nouns, and do not suggest an arbitrary type of order (e.g., spatial, temporal, logical, etc.) unless otherwise defined explicitly. Also, the same reference numbers may be used throughout two or more drawings to refer to parts, components, or units having the same or similar function. However, this use is for simplicity of description and ease of discussion. It is not intended that configurations or structural details of the components or units are the same across all embodiments, or it is not intended that commonly referenced parts/modules are the only way to implement the teachings of specific embodiments disclosed herein.

Unless otherwise defined, all terms (including technical and scientific terms) used herein have the same meaning as commonly understood by one skilled in the art to which the present disclosure belongs.

Below, embodiments of the present disclosure will be described in detail and clearly to such an extent that one skilled in the art easily carries out the present disclosure.

Nowadays, a system that is superior to an electronic computer in terms of a computation speed and energy efficiency of a convolutional artificial neural network is manufactured and verified by using an optical 4*f* system, and the learning accuracy of the artificial neural network is also identical or similar to that of the electronic computer.

However, in the case of the current optical 4*f* system, there is a limitation in reducing the volume thereof due to the size of an optical element and the optical diffraction limit. In other words, the volume of the optical 4*f* system is relatively large compared to the electronic computer. Accordingly, a technology for reducing the volume of the optical 4*f* system is absolutely required to apply the optical artificial neural network to autonomous driving where the convolutional artificial neural network is used, a drone, and a small electronic device to which the Internet of Things is applied.

Figure 1:
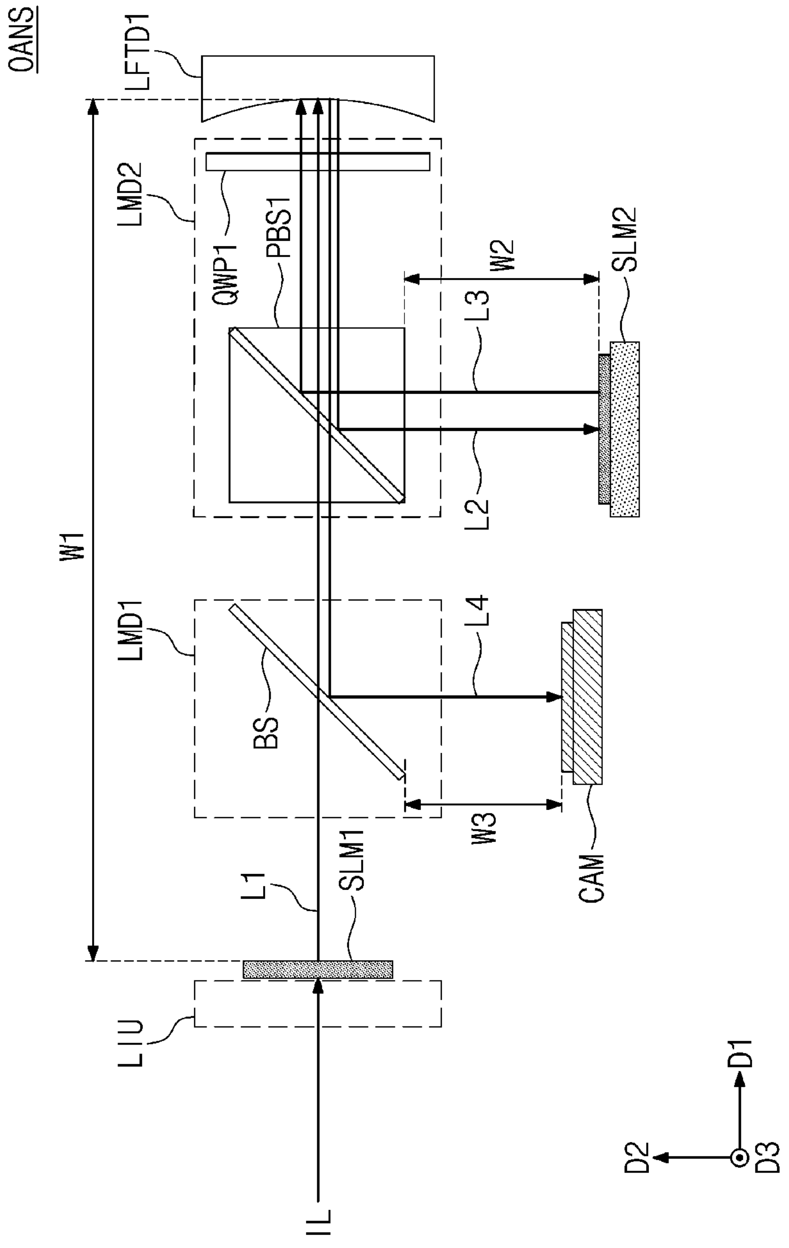
FIG. 1 is a diagram illustrating an optical artificial neural network system according to an embodiment of the present disclosure.
Figure 2:
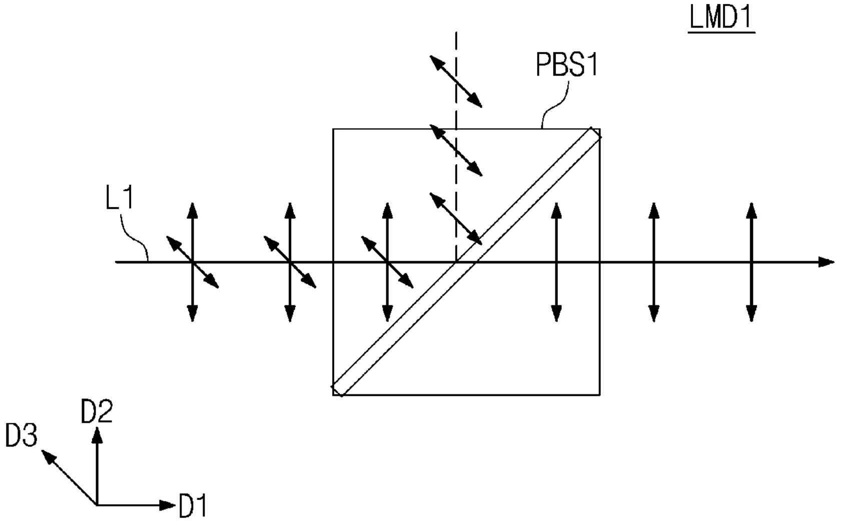
FIG. 2 is a diagram illustrating how a first light passes through a first polarized beam splitter, in FIG. 1.
Figure 3:
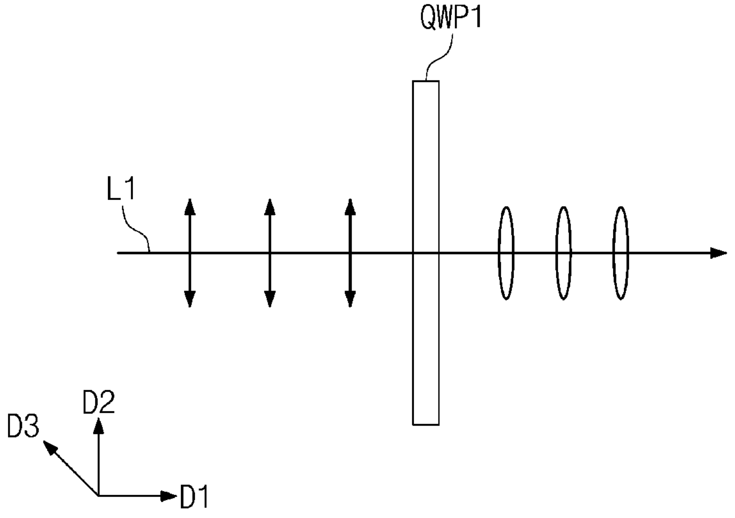
FIGS. 3 and 4 are diagrams illustrating how a first light passes through a first quarter wave-plate, in FIG. 1.
Figure 4:
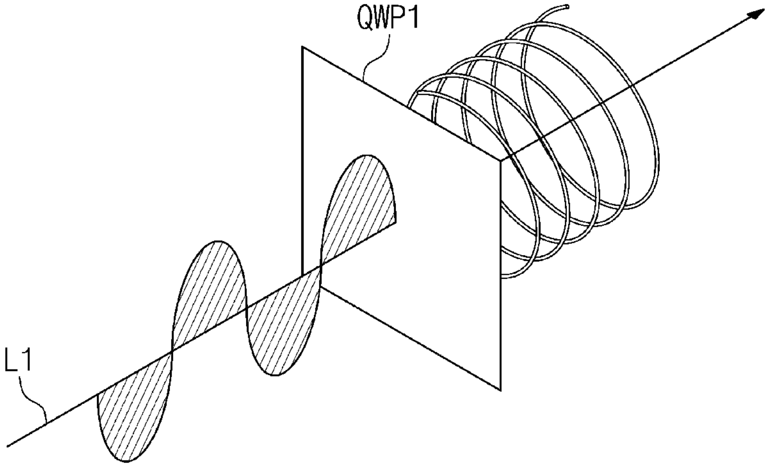
Figure 5:
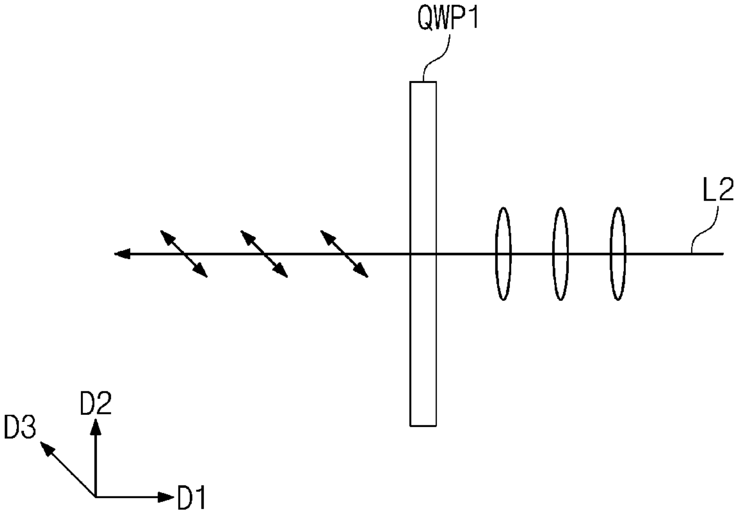
FIGS. 5 and 6 are diagrams illustrating how a second light passes through a first quarter wave-plate, in FIG. 1.
Figure 6:
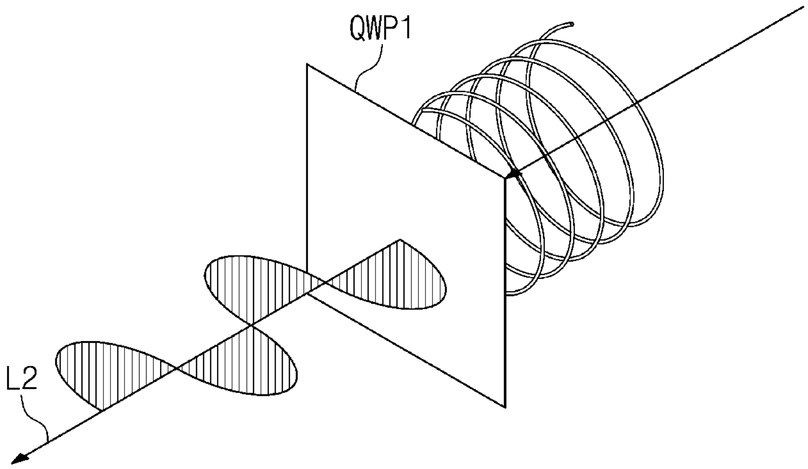
Figure 7:
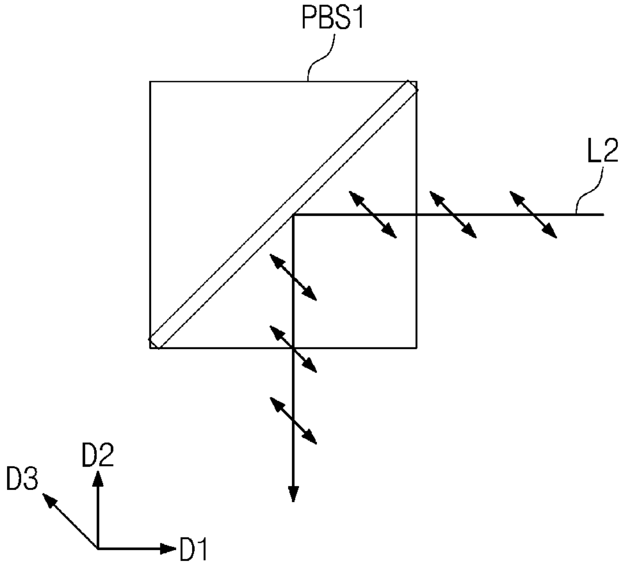
FIG. 7 is a diagram illustrating how a second light is reflected by a first polarized beam splitter, in FIG. 1.
Figure 8:
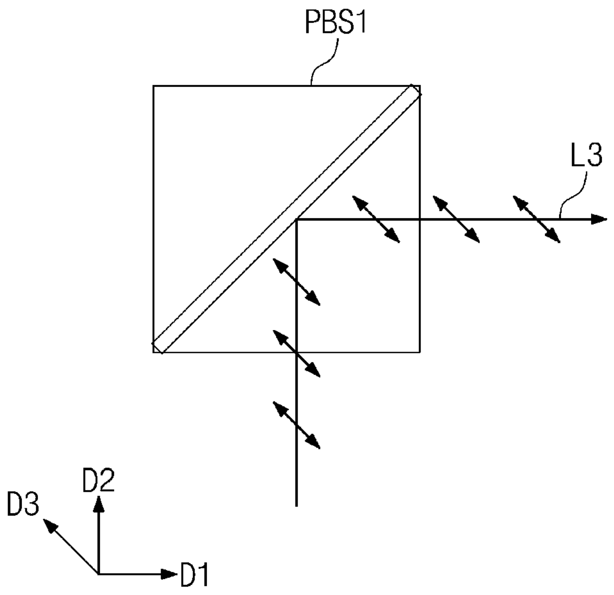
FIG. 8 is a diagram illustrating how a third light is reflected by a first polarized beam splitter, in FIG. 1.
Figure 9:
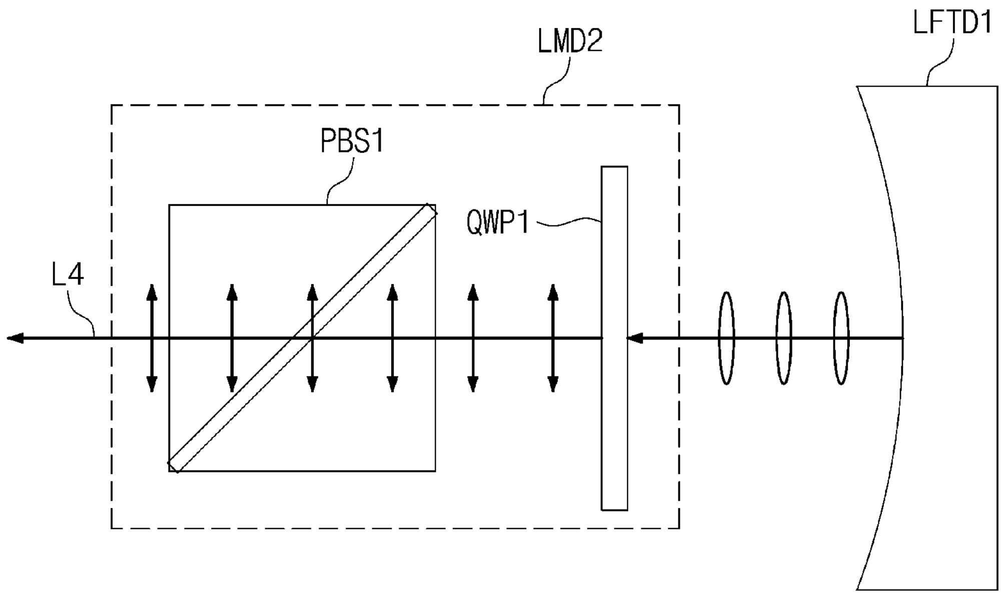
FIG. 9 is a diagram illustrating how a fourth light passes through a first quarter wave-plate and a first polarized beam splitter, in FIG. 1.

FIG. 1 is a diagram illustrating an optical artificial neural network system according to an embodiment of the present disclosure. FIG. 2 is a diagram illustrating how a first light L1 passes through a first polarized beam splitter PBS1, in FIG. 1. FIGS. 3 and 4 are diagrams illustrating how the first light L1 passes through a first quarter wave-plate QWP1, in FIG. 1. FIGS. 5 and 6 are diagrams illustrating how a second light L2 passes through the first quarter wave-plate QWP1, in FIG. 1. FIG. 7 is a diagram illustrating how the second light L2 is reflected by the first polarized beam splitter PBS1, in FIG. 1. FIG. 8 is a diagram illustrating how a third light L3 in FIG. 1 is reflected by the first polarized beam splitter PBS1. FIG. 9 is a diagram illustrating how a fourth light L4 passes through the first quarter wave-plate QWP1 and the first polarized beam splitter PBS1, in FIG. 1. Below, an embodiment of an optical artificial neural network system of the present disclosure will be described in detail with reference to FIGS. 1 to 9.

Referring to FIGS. 1 to 7, an optical artificial neural network system OANS of the present disclosure may include a light insertion unit LIU, a first spatial light modulator SLM1, a first light path adjustment device LMD1, a second light path adjustment device LMD2, a second spatial light modulator SLM2, and an imaging device CAM.

The light insertion unit LIU may be configured to receive an incident light IL. The incident light input to the light insertion unit LIU may travel to the first spatial light modulator SLM1.

The first spatial light modulator SLM1 may modulate the incident light IL and may generate the first light L1 having a first optical image. In an embodiment, the first spatial light modulator SLM1 may be a transmissive spatial light modulator. As the incident light IL is modulated by a plurality of pixels while passing through the first spatial light modulator SLM1 along a first direction D1, the first light L1 having the first optical image may be generated.

The first spatial light modulator SLM1 may include a liquid crystal display (LCD). The first spatial light modulator SLM1 may include the plurality of pixels, each of which includes a plurality of liquid crystals. The pixels and liquid crystals may be individually controlled depending on a user input.

The first light L1 that is generated after the incident light IL passes through the first spatial light modulator SLM1 may travel along the first direction D1. The first light L1 generated by the first spatial light modulator SLM1 may be a light that is not polarized. In other words, the first light L1 may include both a component associated with a second direction D2 perpendicular to the first direction D1 and a component associated with a third direction D3 perpendicular to the first direction D1 and the second direction D2.

The first light path adjustment device LMD1, the second light path adjustment device LMD2, and a first light Fourier transform device LFTD1 may be disposed on a path where the first light L1 travels. At least a portion of the first light L1 may pass through the first light path adjustment device LMD1 and the second light path adjustment device LMD2 and may then be reflected by the first light Fourier transform device LFTD1.

The first light path adjustment device LMD1 may be configured to transmit the first light L1. The first light path adjustment device LMD1 may be disposed between the first spatial light modulator SLM1 and the first polarized beam splitter PBS1. The first light path adjustment device LMD1 may include a beam splitter BS. The beam splitter BS may transmit at least a portion of the first light L1. The first light L1 transmitted through the beam splitter BS may be a light that is not polarized. In other words, the first light L1 transmitted through the beam splitter BS may include both the component associated with the second direction D2 and the component associated with the third direction D3.

The second light path adjustment device LMD2 may be configured to circularly polarize the first light L1 passing through the first light path adjustment device LMD1. The second light path adjustment device LMD2 may be disposed between the first light path adjustment device LMD1 and the first light Fourier transform device LFTD1. The second light path adjustment device LMD2 may include a first polarized beam splitter and a first quarter wave-plate.

The first polarized beam splitter PBS1 may transmit only a component of an incident light, which corresponds to one direction, and may reflect a component of the incident light, which corresponds to a direction perpendicular to the one direction. For example, the first light L1 may be linearly polarized in one direction while passing through the first polarized beam splitter PBS1.

For example, as illustrated in FIG. 2, the first polarized beam splitter PBS1 may transmit a component (hereinafter referred to as a "second direction component") of the first light L1 in the second direction D2 among the second direction component and a component (hereinafter referred to as a "third direction component") of the first light L1 in the third direction D3 and may reflect the third direction component. In other words, the first light L1 may be polarized in the second direction D2 while passing through the first polarized beam splitter PBS1 and may then travel in the first direction D1.

Returning to FIG. 1, the first quarter wave-plate QWP1 may be disposed between the first polarized beam splitter PBS1 and the first light Fourier transform device LFTD1. The first light L1 passing through the first polarized beam splitter PBS1 (i.e., the first light L1 polarized) may be circularly polarized while passing through the first quarter wave-plate QWP1.

For example, as illustrated in FIGS. 3 and 4, the first quarter wave-plate QWP1 may polarize the first light L1 polarized in the second direction D2 to a circularly polarized light. For example, the circularly polarized light may be a light that rotates in a clockwise direction or a counterclockwise direction. The first light L1 passing through the first quarter wave-plate QWP1 may travel in the first direction D1 while a polarization direction rotates to a clockwise direction or a counterclockwise direction.

Returning to FIG. 1, the first light Fourier transform device LFTD1 may generate the second light L2 by reflecting the first light L1 passing through the first quarter wave-plate QWP1. For example, the first light Fourier transform device LFTD1 may include a concave mirror.

The first optical image of the first light L1 may be Fourier-transformed while being reflected by the first light Fourier transform device LFTD1. For example, the first light Fourier transform device LFTD1 may reflect the first light L1 and may generate the second light L2 having a second optical image obtained by Fourier-transforming the first optical image.

The second light L2 may travel in a direction opposite to the first direction D1 and may again travel to the second light path adjustment device LMD2.

For example, as illustrated in FIGS. 5 and 6, the second light L2 reflected by the first light Fourier transform device LFTD1 may be incident in the shape in a circularly polarized light and may pass through the first quarter wave-plate QWP1. The second light L2 circularly polarized may be linearly polarized while passing through the first quarter wave-plate QWP1. The second light L2 passing through the first quarter wave-plate QWP1 may be polarized in the third direction D3.

As described with reference to FIGS. 3 to 6, when the linearly polarized light passes through the first quarter wave-plate QWP1, is reflected, and then passes through the first quarter wave-plate QWP1 again, the polarization direction may be rotated by 90 degrees. For example, when the second light L2 polarized in the second direction D2 may pass through the first quarter wave-plate QWP1, is reflected by the first light Fourier transform device LFTD1, and again passes through the first quarter wave-plate QWP1, the polarization direction may be rotated in the third direction D3.

For example, as illustrated in FIG. 7, because the second light L2 passing through the first quarter wave-plate QWP1 is in a state of being polarized in the third direction D3, the second light L2 may be reflected by the first polarized beam splitter PBS1 without passing through the first polarized beam splitter PBS1. The second light L2 generated by the first light Fourier transform device LFTD1 may travel to the second spatial light modulator SLM2 through the second light path adjustment device LMD2.

Returning to FIG. 1, the second spatial light modulator SLM2 may be disposed such that the second light L2 reflected by the first polarized beam splitter PBS1 is vertically incident.

The second spatial light modulator SLM2 may include a liquid crystal display (LCD). The second spatial light modulator SLM2 may include a plurality of pixels, each of which includes a plurality of liquid crystals. The pixels and liquid crystals may be individually controlled depending on a user input.

In an embodiment, the second spatial light modulator SLM2 may be a reflective spatial light modulator. The second light L2 may be modulated by the plurality of pixels after being vertically reflected to the second spatial light modulator SLM2, and thus, a third optical image may be generated.

The second spatial light modulator SLM2 may generate the third light L3 by modulating the second light L2 reflected by the first polarized beam splitter PBS1 so as to have the third optical image corresponding to a result of multiplying the second optical image and a Fourier-transformed kernel function together.

The third light L3 that is reflected and generated by the second spatial light modulator SLM2 may travel along the second direction D2. Like the second light L2, the third light L3 may be in a state of being polarized in the third direction D3.

The third light L3 generated by the second spatial light modulator SLM2 may travel to the first light Fourier transform device LFTD1 through the second light path adjustment device LMD2. For example, as illustrated in FIG. 8, because the third light L3 reflected by the second spatial light modulator SLM2 is in a state of being polarized in the third direction D3, the third light L3 may be reflected by the first polarized beam splitter PBS1. The third light L3 reflected by the first polarized beam splitter PBS1 may travel along the first direction D1.

Returning to FIG. 1, the third light L3 reflected by the first polarized beam splitter PBS1 may pass through the first quarter wave-plate QWP1 in a polarized state and may be reflected by the first light Fourier transform device LFTD1.

The first light Fourier transform device LFTD1 may generate the fourth light L4 by reflecting the third light L3 passing through the first quarter wave-plate QWP1. The third optical image of the third light L3 may be inversely Fourier-transformed while being reflected by the first light Fourier transform device LFTD1.

For example, the first light Fourier transform device LFTD1 may reflect the third light L3 and may generate the fourth light L4 having a fourth optical image that is expressed in the form of a convolution of a function of the first optical image and a kernel function.

$$f(x)*g(x)=\mathcal{F}^{-1}(F(x')\cdot G(x')) \quad \text{[Equation 1]}$$

In Equation 1, f(x) is a function of the first optical image, g(x) is a kernel function, F(x') is a function of the first optical image Fourier-transformed, and G(x') is a kernel function Fourier-transformed.

For example, as illustrated in FIG. 9, the third light L3 reflected by the first light Fourier transform device LFTD1 may again pass through the first quarter wave-plate QWP1 and may travel to the first light path adjustment device LMD1.

As described with reference to FIGS. 3 to 6, the third light L3 passing through the first quarter wave-plate QWP1 in a state of being polarized in the third direction D3 may be circularly polarized, may then be reflected by the first light Fourier transform device LFTD1, and may again pass through the first quarter wave-plate QWP1 such that the polarization direction is rotated by 90 degrees. In other words, the fourth light L4 reflected by the first light Fourier transform device LFTD1 may be linearly polarized in the second direction D2 while passing through the first quarter wave-plate QWP1. The fourth light L4 linearly polarized in the second direction D2 may pass through the first polarized beam splitter PBS1.

Returning to FIG. 1, at least a portion of the fourth light L4 passing through the first polarized beam splitter PBS1 may be reflected by the beam splitter BS of the first light path adjustment device LMD1.

The imaging device CAM may be disposed to be spaced from the first light path adjustment device LMD1 in the second direction D2. The imaging device CAM may receive the fourth light L4 reflected by the beam splitter BS.

The imaging device CAM may convert the fourth light L4 into an electrical signal. As such, electrical information about an optical image of the fourth light L4 corresponding to a convolution of the function of the first optical image and the kernel function may be obtained.

In an embodiment, a light path of the first light L1 that travels between the first spatial light modulator SLM1 and the first light Fourier transform device LFTD1 may be identical to a focal length of the first light Fourier transform device LFTD1. For example, in consideration of refractive indices of the first light path adjustment device LMD1 (e.g., the beam splitter BS) and the second light path adjustment device LMD2 (e.g., the first polarized beam splitter PBS1 and the first quarter wave-plate QWP1) disposed on a traveling path of the first light L1, a distance W1 between the first light Fourier transform device LFTD1 and the first spatial light modulator SLM1 may be determined such that the light path of the first light L1 is identical to the focal length of the concave mirror of the first light Fourier transform device LFTD1.

In an embodiment, a light path of the second light L2 that travels between the first light Fourier transform device LFTD1 and the second spatial light modulator SLM2 may be identical to the focal length of the first light Fourier transform device LFTD1. For example, in consideration of the refractive index of the second light path adjustment device LMD2 (e.g., the first quarter wave-plate QWP1 and the first polarized beam splitter PBS1) disposed on a traveling path of the second light L2, a distance W2 between the second spatial light modulator SLM2 and the second light path adjustment device LMD2 may be determined such that the light path of the second light L2 is identical to the focal length of the first light Fourier transform device LFTD1.

In an embodiment, a light path of the fourth light L4 that travels between the first light Fourier transform device LFTD1 and the imaging device CAM may be identical to the focal length of the first light Fourier transform device LFTD1. For example, in consideration of the refractive indices of the first light path adjustment device LMD1 and the second light path adjustment device LMD2 disposed on a traveling path of the fourth light L4, a distance W3 between the imaging device CAM and the first light path adjustment device LMD1 may be determined such that the light path of the fourth light L4 is identical to the focal length of the first light Fourier transform device LFTD1.

According to an embodiment of the present disclosure, a 4*f* optical artificial neural network system in which a horizontal length is shortened may be provided. As the optical artificial neural network system according to the present disclosure is miniaturized, mobility and keeping convenience may be improved.

According to an embodiment of the present disclosure, a 4*f* optical artificial neural network system may be implemented by using the first light Fourier transform device LFTD1. As such, light misalignment and aberration capable of occurring when the number of optical parts increases may be improved according to the present disclosure.

Figure 10:
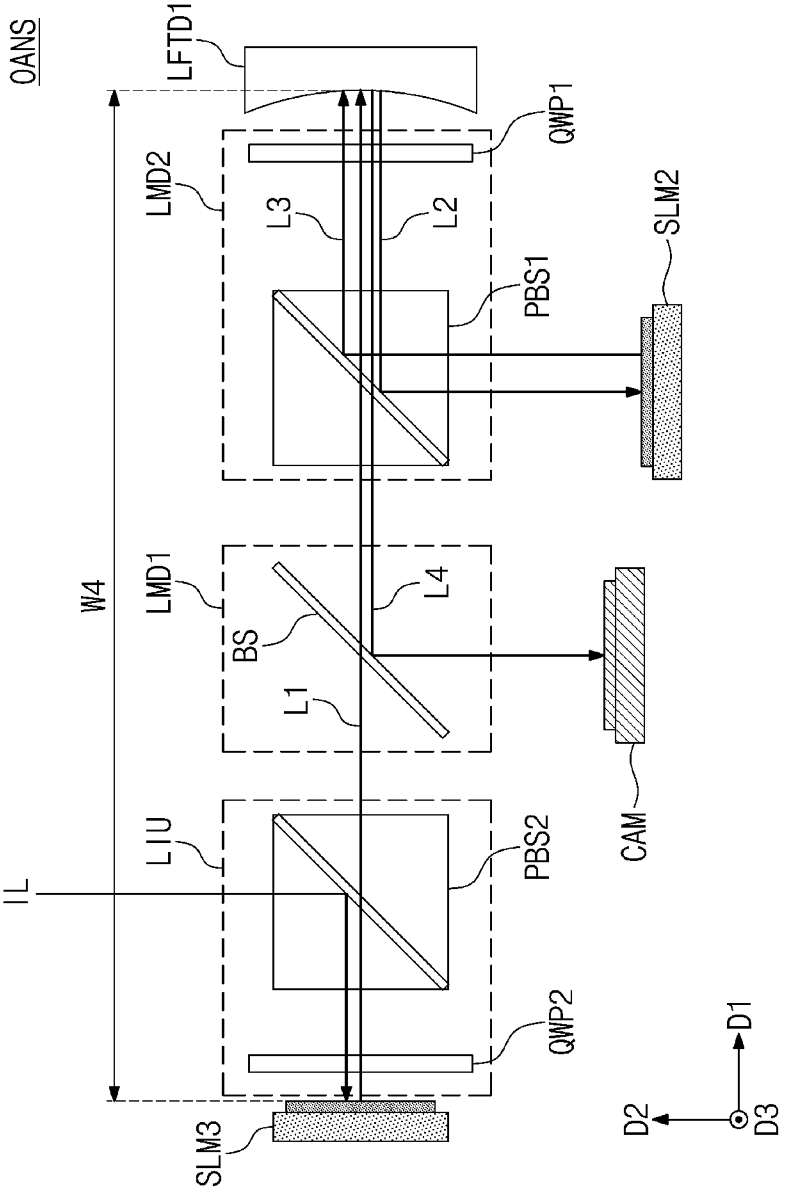
FIG. 10 is a diagram illustrating an optical artificial neural network system according to an embodiment of the present disclosure.

FIG. 10 is a diagram illustrating an optical artificial neural network system according to an embodiment of the present disclosure. Below, a difference with an embodiment described with reference to FIGS. 1 to 9 will be described in detail.

Referring to FIG. 10, the optical artificial neural network system OANS may replace the first spatial light modulator SLM1 with a third spatial light modulator SLM3, and the light insertion unit LIU may further include a second polarized beam splitter PBS2 and a second quarter wave-plate QWP2.

Like the second spatial light modulator SLM2, the third spatial light modulator SLM3 may be a reflective spatial light modulator.

The light insertion unit LIU may further include the second polarized beam splitter PBS2 and the second quarter wave-plate QWP2. The second polarized beam splitter PBS2 may be disposed between the first light path adjustment device LMD1 and the third spatial light modulator SLM3. The second quarter wave-plate QWP2 may be disposed between the second polarized beam splitter PBS2 and the third spatial light modulator SLM3.

In the light insertion unit LIU, the incident light IL may be input to the second polarized beam splitter PBS2, and the incident light IL reflected by the second polarized beam splitter PBS2 may be vertically incident onto the third spatial light modulator SLM3 through the second quarter wave-plate QWP2.

A polarization light axis of the second polarized beam splitter PBS2 may have the same direction as a polarization light axis of the first polarized beam splitter PBS1. In other words, the polarization light axes may be arranged such that the second polarized beam splitter PBS2 transmits the second direction component of a light traveling in the first direction D1 and reflects the light of the third direction component. The third direction component of the first light L1 may be reflected by the second polarized beam splitter PBS2 and may travel toward the second quarter wave-plate QWP2.

A polarization light axis of the second quarter wave-plate QWP2 may have the same direction as the polarization light axis of the first quarter wave-plate QWP1. In other words, when a light polarized in the third direction D3 passes through the second quarter wave-plate QWP2, the light may be circularly polarized in a clockwise direction or a counterclockwise direction.

The first light L1 having the first optical image may be generated while the incident light IL passing through the second quarter wave-plate QWP2 is vertically reflected by the third spatial light modulator SLM3. The first light L1 may travel along the first direction D1.

The first light L1 reflected by the third spatial light modulator SLM3 may pass through the second quarter wave-plate QWP2 in a circularly polarized state. The first light L1 circularly polarized may be polarized in the second direction D2 while passing through the second quarter wave-plate QWP2. The first light L1 polarized in the second direction D2 may pass through the second polarized beam splitter PBS2. In the process where the first light L1 passing through the second polarized beam splitter PB S2 reaches the imaging device CAM, the light paths of the second to fourth lights L2 to L4 may be substantially the same as those described with reference to FIGS. 1 to 9.

In an embodiment, the light path of the first light L1 that travels between the third spatial light modulator SLM3 and the first light Fourier transform device LFTD1 may be identical to the focal length of the first light Fourier transform device LFTD1. For example, in consideration of refractive indices of the light insertion unit LIU (e.g., the second polarized beam splitter PBS2 and the second quarter wave-plate QWP2), the first light path adjustment device LMD1, and the second light path adjustment device LMD2 disposed on the traveling path of the first light L1, a distance W4 between the first light Fourier transform device LFTD1 and the third spatial light modulator SLM3 may be determined such that the light path of the first light L1 is identical to the focal length of the first light Fourier transform device LFTD1.

Figure 11:
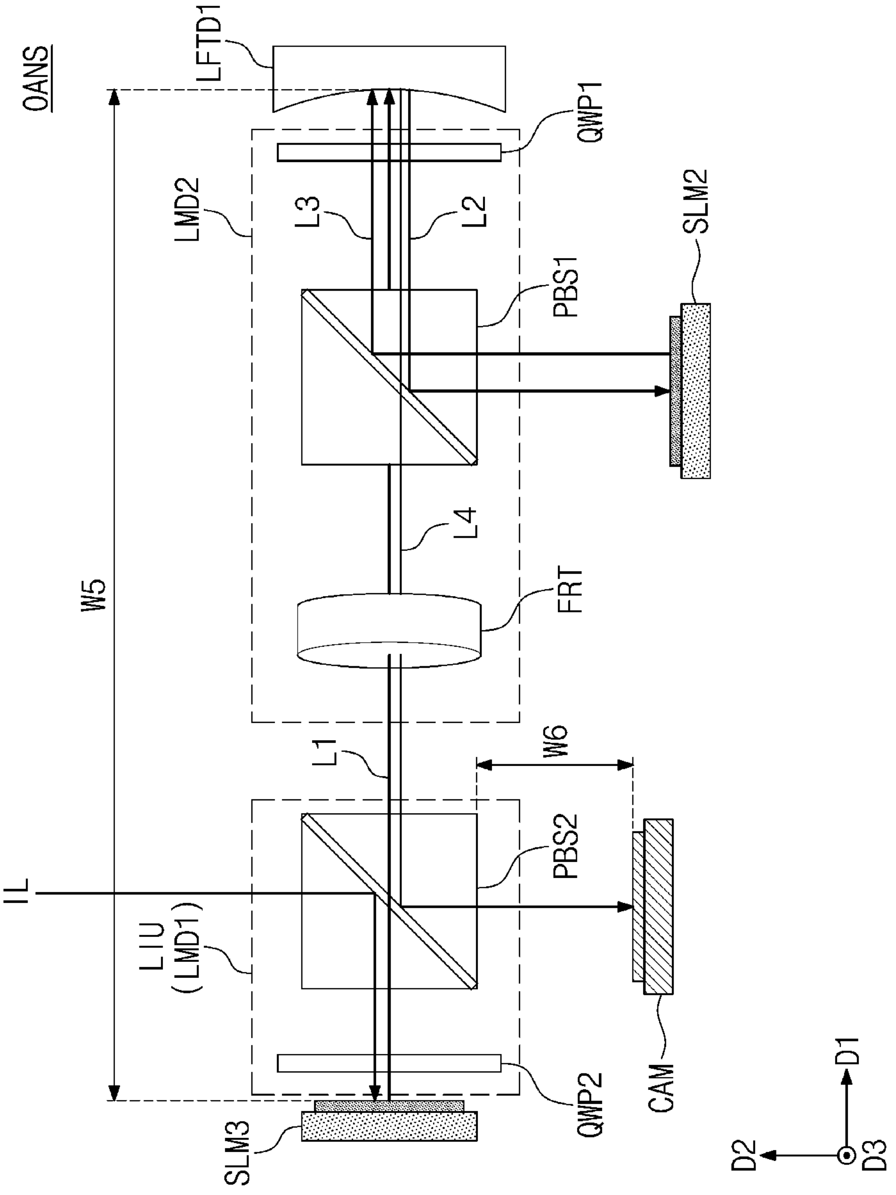
FIG. 11 is a diagram illustrating an optical artificial neural network system according to an embodiment of the present disclosure.
Figure 12:
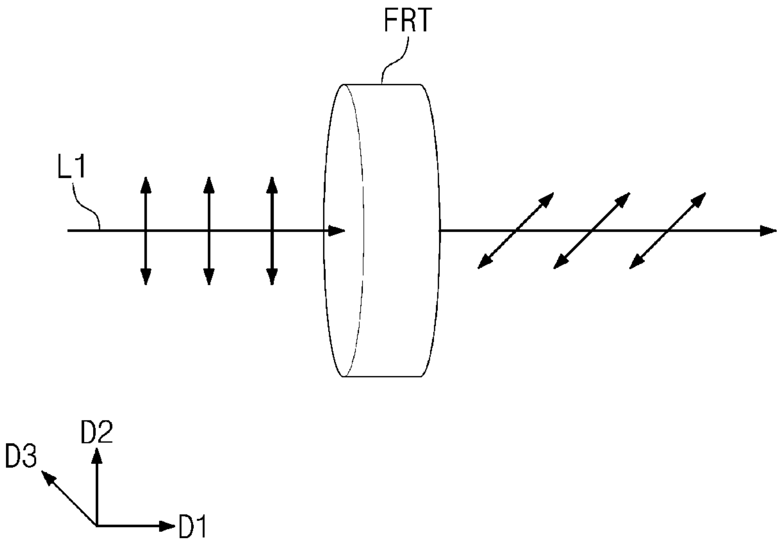
FIGS. 12 and 13 are diagrams illustrating how a first light passes through a polarization rotator, in FIG. 11.
Figure 13:
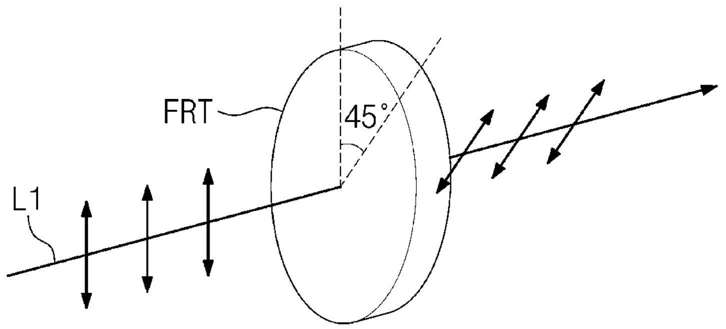
Figure 14:
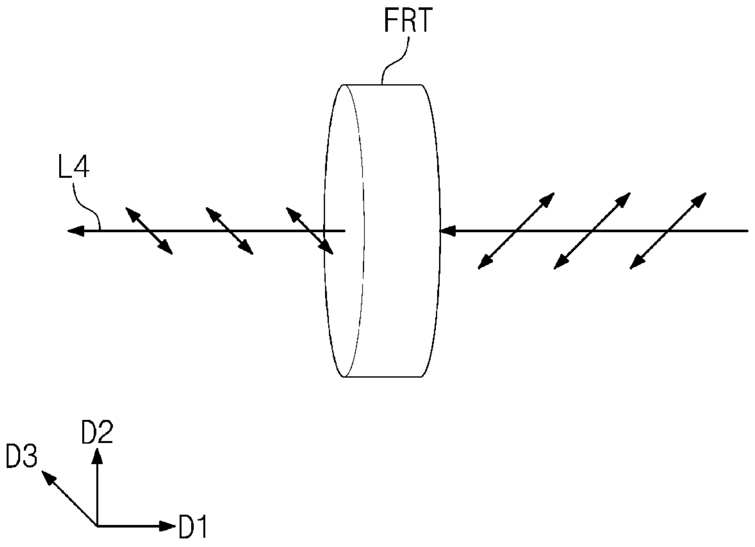
FIGS. 14 and 15 are diagrams illustrating how a fourth light passes through a polarization rotator, in FIG. 11.
Figure 15:
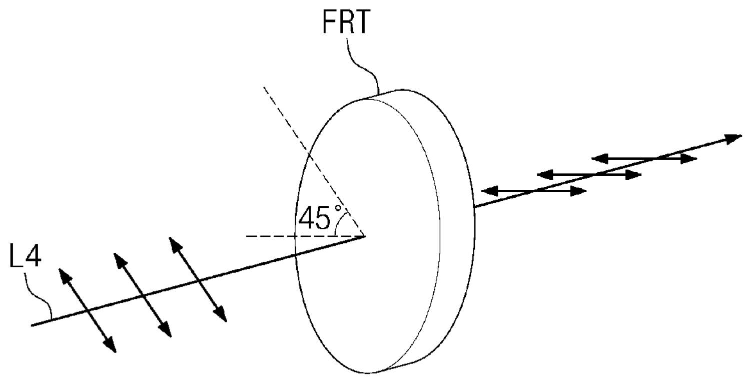

FIG. 11 is a diagram illustrating an optical artificial neural network system according to an embodiment of the present disclosure. FIGS. 12 and 13 are diagrams illustrating how the first light L1 passes through a polarization rotator FRT, in FIG. 11. FIGS. 14 and 15 are diagrams illustrating how the fourth light L4 passes through the polarization rotator FRT, in FIG. 11. Below, a difference with an embodiment described with reference to FIG. 10 will be described in detail.

Unlike the optical artificial neural network system OANS of FIG. 10, the optical artificial neural network system OANS illustrated in FIG. 11 may further include the polarization rotator FRT and may not include the first light path adjustment device LMD1. In this case, the second light path adjustment device LMD2 may further include the polarization rotator FRT (e.g., the light insertion unit LIU and the first light path adjustment device LMD1 of FIG. 10 may be integrated).

The polarization rotator FRT may be disposed between the first polarized beam splitter PBS1 and the second polarized beam splitter PBS2. The imaging device CAM may be disposed to be spaced from the second polarized beam splitter PBS2 along the second direction D2.

The polarization rotator FRT may include a Faraday rotator. The polarization rotator FRT may rotate a light passing therethrough in a clockwise direction or a counterclockwise direction by 45 degrees.

Referring to FIGS. 12 and 13, when a light passing through the polarization rotator FRT in the first direction D1 is linearly polarized in the second direction D2, the light may be rotated by 45 degrees while passing through the polarization rotator FRT.

A polarization light axis of the first polarized beam splitter PBS1 may be arranged to be rotated by 45 degrees around the polarization light axis of the second polarized beam splitter PBS2. The first light L1 whose polarization direction is rotated by 45 degrees while passing through the polarization rotator FRT may pass through the first polarized beam splitter PBS1.

Paths of the first to third lights L1 to L3 may be substantially the same as those described with reference to FIG. 10. The fourth light L4 may be reflected by the first light Fourier transform device LFTD1 and may then pass through the first quarter wave-plate QWP1 and the first polarized beam splitter PBS1.

The fourth light L4 reflected by the first light Fourier transform device LFTD1 may pass through the first polarized beam splitter PBS1 in a polarization state where it is rotated by 45 degrees around the second direction D2.

Referring to FIGS. 14 and 15, when the fourth light L4 is reflected by the first light Fourier transform device LFTD1 and passes through the polarization rotator FRT, a polarization direction of the fourth light L4 may be rotated by 45 degrees so as to be polarized in the third direction D3.

The fourth light L4 polarized in the third direction D3 may be reflected by the first polarized beam splitter PBS1 and may travel toward the imaging device CAM.

In an embodiment, the light path of the first light L1 that travels between the third spatial light modulator SLM3 and the first light Fourier transform device LFTD1 may be identical to the focal length of the first light Fourier transform device LFTD1. For example, in consideration of refractive indices of the light insertion unit LIU and the second light path adjustment device LMD2 (e.g., the polarization rotator FRT, the first polarized beam splitter PBS1, and the first quarter wave-plate QWP1) disposed on a traveling path of the first light L1, a distance W5 between the first light Fourier transform device LFTD1 and the third spatial light modulator SLM3 may be determined such that the light path of the first light L1 is identical to the focal length of the first light Fourier transform device LFTD1.

In an embodiment, a light path of the fourth light L4 that travels between the first light Fourier transform device LFTD1 and the imaging device CAM may be identical to the focal length of the first light Fourier transform device LFTD1. For example, in consideration of the refractive indices of the first quarter wave-plate QWP1, the first polarized beam splitter PBS1, the polarization rotator FRT, and the second polarized beam splitter PBS2 disposed on a traveling path of the fourth light L4, a distance W6 between the imaging device CAM and the second polarized beam splitter PBS2 of the light insertion unit LIU may be determined such that the light path of the fourth light L4 is identical to the focal length of the first light Fourier transform device LFTD1.

In an embodiment, unlike the embodiment of FIG. 10, because a beam splitter is not used, the efficiency of light may be improved.

Figure 16:
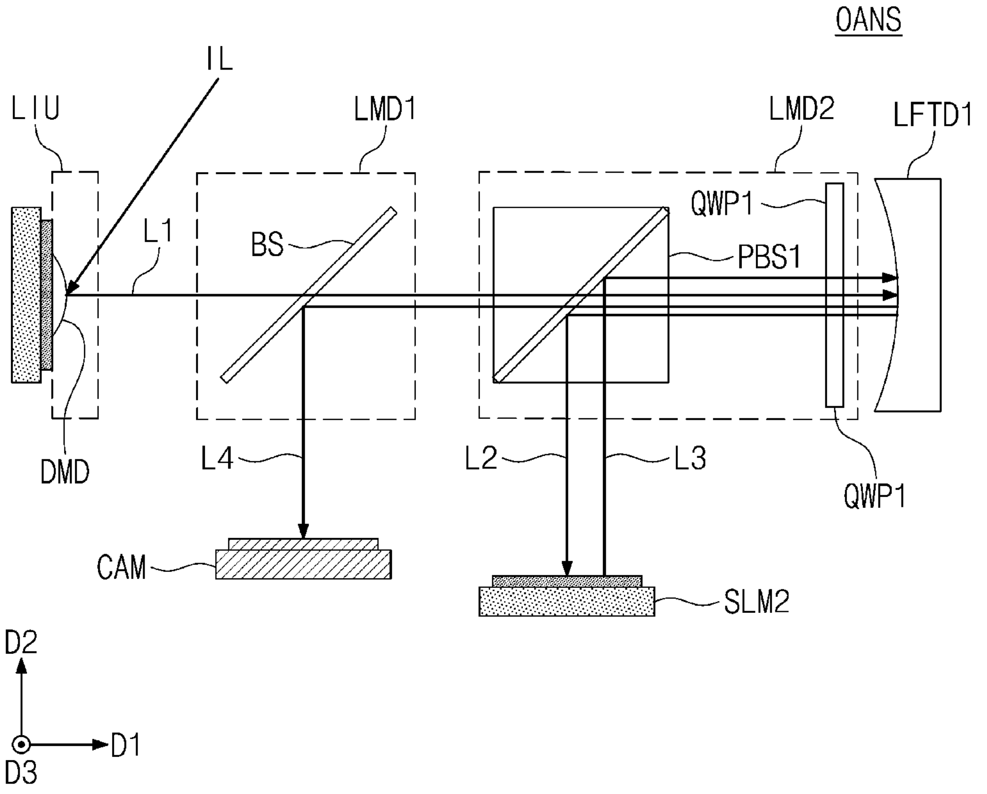
FIG. 16 is a diagram illustrating an optical artificial neural network system according to an embodiment of the present disclosure.

FIG. 16 is a diagram illustrating an optical artificial neural network system according to an embodiment of the present disclosure. Below, a difference with an embodiment described with reference to FIGS. 1 to 9 will be described in detail.

Referring to FIG. 16, the optical artificial neural network system OANS may replace the first spatial light modulator SLM1 with a digital micro-mirror device DMD. The digital micro-mirror device DMD may be a reflective spatial light modulator. The digital micro-mirror device DMD may reflect the incident light IL, which is input to the digital micro-mirror device DMD in an arbitrary direction, in a vertical direction (i.e., the first direction D1).

As the incident light IL is incident onto the digital micro-mirror device DMD through the light insertion unit LIU and is vertically reflected by the digital micro-mirror device DMD, the first light L1 having the first optical image may be generated. The first light L1 may travel along the first direction D1.

Paths of the first to fourth lights L1 to L4 may be substantially the same as those described with reference to FIG. 1 to FIG. 9.

Figure 17:
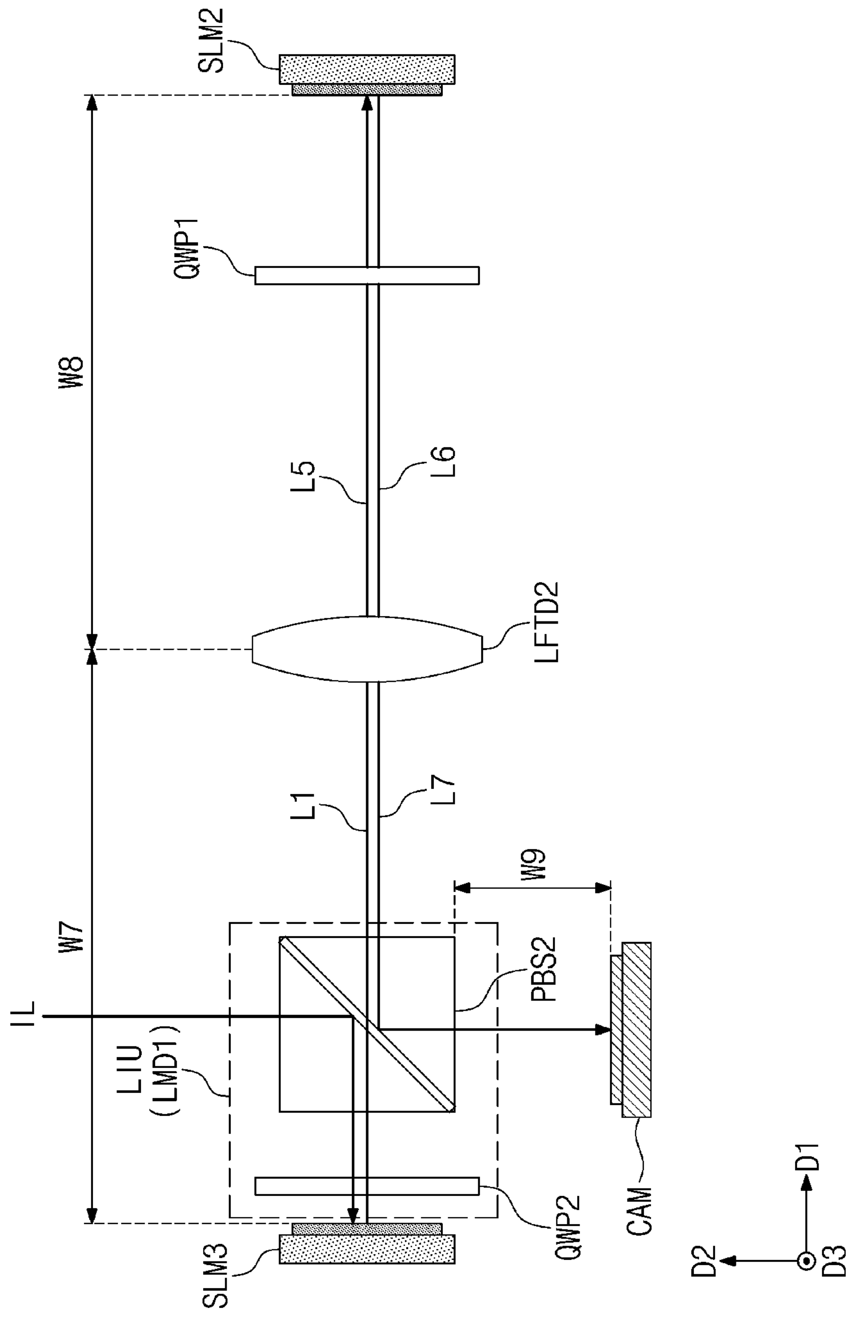
FIG. 17 is a diagram illustrating an optical artificial neural network system according to an embodiment of the present disclosure.

FIG. 17 is a diagram illustrating an optical artificial neural network system according to an embodiment of the present disclosure. Below, a difference with an embodiment described with reference to FIG. 10 will be described in detail.

Unlike the optical artificial neural network system OANS of FIG. 10, the optical artificial neural network system OANS illustrated in FIG. 17 may further include a second light Fourier transform device LFTD2 and may not include the first polarized beam splitter PBS1 and the beam splitter BS.

The second spatial light modulator SLM2 and the third spatial light modulator SLM3 may be disposed to face each other. The second quarter wave-plate QWP2, the second polarized beam splitter PBS2, the second light Fourier transform device LFTD2, and the first quarter wave-plate QWP1 may be sequentially disposed along the first direction D1 between the second spatial light modulator SLM2 and the third spatial light modulator SLM3. The second light Fourier transform device LFTD2 may include a convex mirror.

The incident light IL may be reflected by the third spatial light modulator SLM3 in a state where the third direction component of the incident light IL is reflected by the second polarized beam splitter PBS2 and the incident light IL is circularly polarized while passing through the second quarter wave-plate QWP2. Like the second spatial light modulator SLM2, the third spatial light modulator SLM3 may be a reflective spatial light modulator.

The first light L1 having the first optical image may be generated while the incident light IL passing through the second quarter wave-plate QWP2 is vertically reflected by the third spatial light modulator SLM3. As the first light L1 is polarized in the second direction D2 while passing through the second quarter wave-plate QWP2 in a circularly polarized state, the first light L1 may travel along the first direction D1.

The first optical image of the first light L1 may be Fourier-transformed while passing through the second light Fourier transform device LFTD2. For example, the second light Fourier transform device LFTD2 may generate a fifth light L5 having a second optical image obtained by Fourier-transforming the first optical image while transmitting the first light L1.

The fifth light L5 polarized in the second direction D2 may be circularly polarized in a clockwise direction or a counterclockwise direction while passing the first quarter wave-plate QWP1. A sixth light L6 may be generated as the fifth light L5 passing through the first quarter wave-plate QWP1 is vertically reflected by the second spatial light modulator SLM2.

The second spatial light modulator SLM2 may generate the sixth light L6 by modulating the fifth light L5 so as to have a third optical image corresponding to a result of multiplying the second optical image and the Fourier-transformed kernel function together.

The sixth light L6 may be linearly polarized in the third direction D3 while again passing through the first quarter wave-plate QWP1 in a circularly polarized state.

The third optical image of the sixth light L6 may be inversely Fourier-transformed while passing through the second light Fourier transform device LFTD2.

For example, the second light Fourier transform device LFTD2 may generate a seventh light L7 having a fourth optical image obtained by Fourier-transforming the third optical image while transmitting the sixth light L6

For example, the second light Fourier transform device LFTD2 may transmit the sixth light L6 and may generate the seventh light L7 having the fourth optical image that is expressed in the form of a convolution of the function of the first optical image and the kernel function as expressed by Equation 1 above.

Because the seventh light L7 is in a state of being polarized in the third direction D3, the seventh light L7 may be reflected by the second polarized beam splitter PBS2.

The imaging device CAM may be disposed to be spaced from the second polarized beam splitter PBS2 along the second direction D2. The imaging device CAM may receive the seventh light L7 reflected by the second polarized beam splitter PBS2.

In an embodiment, the light path of the first light L1 that travels between the third spatial light modulator SLM3 and the second light Fourier transform device LFTD2 may be identical to the focal length of the second light Fourier transform device LFTD2. For example, in consideration of refractive indices of the second quarter wave-plate QWP2 and the second polarized beam splitter PBS2 disposed on a traveling path of the first light L1, a distance W7 between the second light Fourier transform device LFTD2 and the third spatial light modulator SLM3 may be determined such that the light path of the first light L1 is identical to the focal length of the second light Fourier transform device LFTD2.

In an embodiment, a light path of the fifth light L5 that travels between the second light Fourier transform device LFTD2 and the second spatial light modulator SLM2 may be identical to the focal length of the second light Fourier transform device LFTD2. For example, in consideration of the refractive index of the first quarter wave-plate QWP1 disposed on a traveling path of the fifth light L5, a distance W8 between the second spatial light modulator SLM2 and the second light Fourier transform device LFTD2 may be determined such that the light path of the fifth light L5 is identical to the focal length of the second light Fourier transform device LFTD2.

In an embodiment, a light path of the seventh light L7 that travels between the second light Fourier transform device LFTD2 and the imaging device CAM may be identical to the focal length of the second light Fourier transform device LFTD2. For example, in consideration of the refractive index of the second polarized beam splitter PBS2 disposed on a traveling path of the seventh light L7, a distance W9 between the imaging device CAM and the second polarized beam splitter PBS2 may be determined such that the light path of the seventh light L7 is identical to the focal length of the second light Fourier transform device LFTD2.

Figure 18:
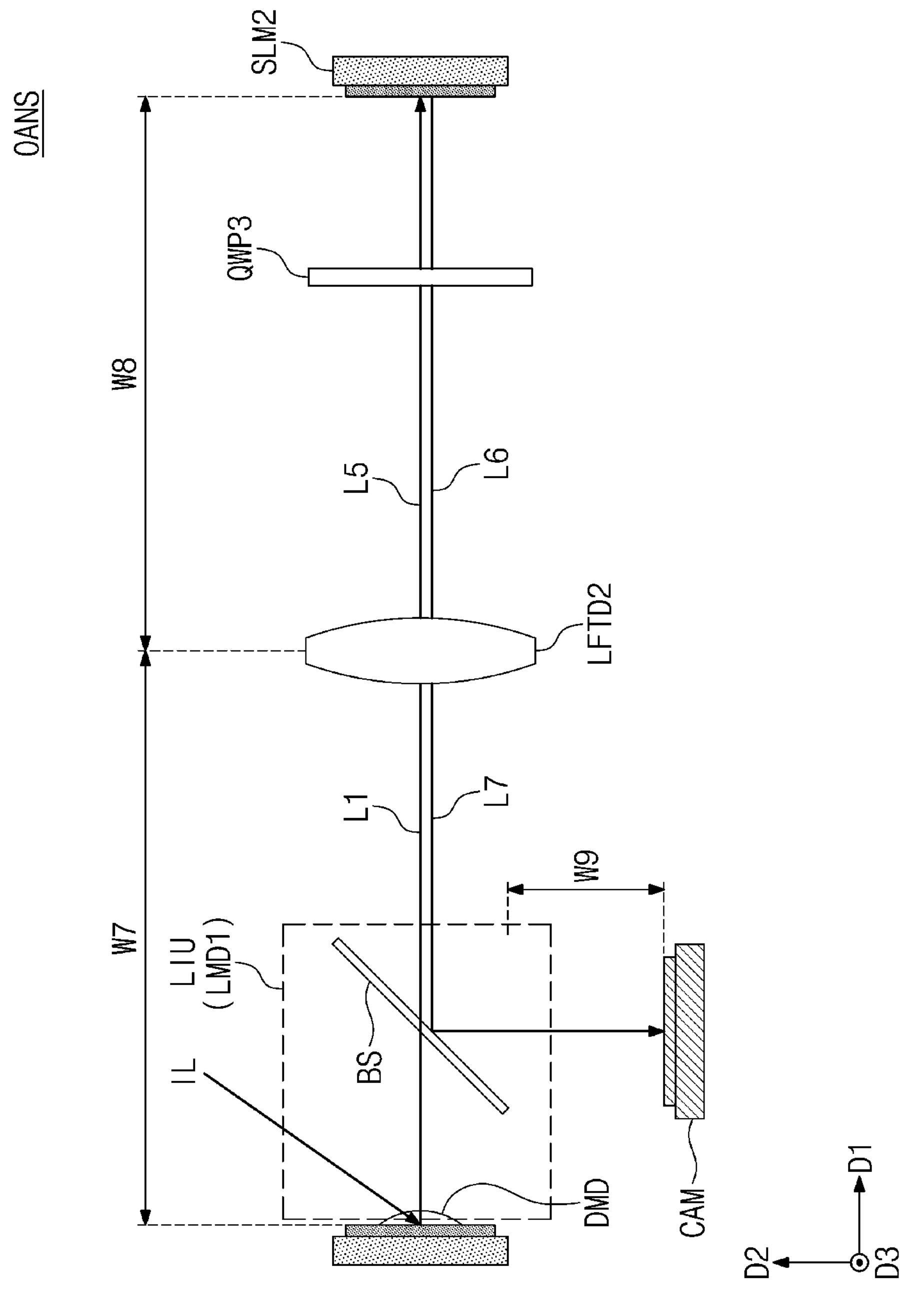
FIG. 18 is a diagram illustrating an optical artificial neural network system according to an embodiment of the present disclosure.

FIG. 18 is a diagram illustrating an optical artificial neural network system according to an embodiment of the present disclosure. Below, a difference with an embodiment described with reference to FIG. 17 will be described in detail.

Referring to FIG. 18, the light insertion unit LIU may further include the digital micro-mirror device DMD. The digital micro-mirror device DMD may be a reflective spatial light modulator. The digital micro-mirror device DMD may reflect the incident light IL, which is input to the digital micro-mirror device DMD in an arbitrary direction, in a vertical direction (i.e., the first direction D1).

As the incident light IL is incident onto the digital micro-mirror device DMD through the light insertion unit LIU and is vertically reflected by the digital micro-mirror device DMD, the first light L1 having the first optical image may be generated. The first light L1 may travel along the first direction D1.

Paths of the first light L1, the fifth light L5, the sixth light L6, and the seventh light L7 may be substantially the same as those described with reference to FIG. 17.

The present disclosure provides a miniaturized optical artificial neural network system.

The present disclosure provides an optical artificial neural network system with an improved optical characteristic.

While the present disclosure has been described with reference to embodiments thereof, it will be apparent to those of ordinary skill in the art that various changes and modifications may be made thereto without departing from the spirit and scope of the present disclosure as set forth in the following claims.

What is claimed is:

1. An optical artificial neural network system comprising:
a light insertion unit configured to receive an incident light;
a first spatial light modulator configured to modulate the incident light received by the light insertion unit to generate a first light having a first optical image;
a second light path adjustment device configured to circularly polarize the first light;
a light Fourier transform device configured to reflect the first light circularly polarized, to generate a second light having a second optical image; and
a second spatial light modulator configured to modulate the second light to generate a third light having a third optical image,
wherein the light Fourier transform device is configured to reflect the third light to generate a fourth light having a fourth optical image,
wherein the light Fourier transform device includes a concave mirror, and
wherein the second spatial light modulator is arranged so as to be perpendicular to an optical axis of the light Fourier transform device.

2. The optical artificial neural network system of claim 1, further comprising a first light path adjustment device,
wherein the first light path adjustment device is configured to transmit the first light,
wherein the second light path adjustment device is configured to circularly polarize the first light passing through the first light path adjustment device,
wherein the second light generated by the light Fourier transform device travels to the second spatial light modulator through the second light path adjustment device, wherein the third light generated by the second spatial light modulator travels to the light Fourier transform device through the second light path adjustment device, and wherein the first light path adjustment device is configured to change a light path of the fourth light.

3. The optical artificial neural network system of claim 2, wherein the light insertion unit includes a polarized beam splitter and a quarter wave-plate, wherein the polarized beam splitter is configured to reflect a first direction component of the incident light toward the first spatial light modulator, and wherein the quarter wave-plate is configured to circularly polarize the first direction component of the first light reflected by the polarized beam splitter.

4. The optical artificial neural network system of claim 3, wherein the first light path adjustment device includes a Faraday rotator configured to rotate a polarization direction of a transmitted light by 45 degrees, and wherein the fourth light passing through the Faraday rotator is reflected by the polarized beam splitter.

5. The optical artificial neural network system of claim 2, wherein the light insertion unit includes a digital micromirror device configured such that the second light is vertically reflected by the first spatial light modulator.

6. The optical artificial neural network system of claim 2, wherein the first light path adjustment device includes:

a beam splitter configured to reflect the fourth light to change the light path of the fourth light.

7. The optical artificial neural network system of claim 2, wherein the second light path adjustment device includes a polarized beam splitter and a quarter wave-plate, wherein the polarized beam splitter is configured to:

transmit a first direction component of the first light; and reflect a second direction component of the first light, and wherein the quarter wave-plate is configured to circularly polarize the first direction component of the first light passing through the polarized beam splitter.

8. The optical artificial neural network system of claim 1, wherein a distance between the concave mirror and the first spatial light modulator is determined in consideration of refractive indices of components included in the light insertion unit, the first light path adjustment device, and the second light path adjustment device disposed on a traveling path of the first light, such that a light path of the first light is identical to a focal length of the concave mirror.

9. The optical artificial neural network system of claim 8, wherein a distance between the second spatial light modulator and the second light path adjustment device is determined in consideration of refractive indices of components in the second light path adjustment device disposed on a traveling path of the second light, such that a light path of the second light is identical to the focal length of the concave mirror.

10. The optical artificial neural network system of claim 1, further comprising:

an imaging device configured to pick up the fourth light whose light path is changed by the first light path adjustment device.

11. The optical artificial neural network system of claim 10, wherein a distance between the imaging device and the first light path adjustment device is determined in consideration of refractive indices of components included in the first light path adjustment device and the second light path adjustment device disposed on a traveling path of the fourth light, such that the light path of the fourth light is identical to a focal length of the concave mirror.

12. An optical artificial neural network system comprising:

a light insertion unit configured to receive an incident light;

a first spatial light modulator configured to modulate the incident light received by the light insertion unit to generate a first light having a first optical image;

a light Fourier transform device configured to transmit the first light to generate a second light having a second optical image; and a second spatial light modulator configured to reflect the second light to generate a third light having a third optical image, wherein the light Fourier transform device is configured to transmit the third light to generate a fourth light having a fourth optical image, wherein the light Fourier transform device includes a concave mirror, and wherein the second spatial light modulator is arranged so as to be perpendicular to an optical axis of the light Fourier transform device.

13. The optical artificial neural network system of claim 12, wherein the light insertion unit includes a polarized beam splitter and a second quarter wave-plate, wherein the polarized beam splitter is configured to reflect a first direction component of the incident light toward the first spatial light modulator, and wherein the second quarter wave-plate is configured to circularly polarize the first direction component of the first light reflected by the polarized beam splitter.

14. The optical artificial neural network system of claim 12, wherein the light insertion unit includes a digital micromirror device configured such that the second light is vertically reflected by the first spatial light modulator.

15. The optical artificial neural network system of claim 12, wherein the light Fourier transform device includes a convex lens.

16. The optical artificial neural network system of claim 15, wherein a distance between the convex lens and the first spatial light modulator is determined in consideration of refractive indices of components included in the light insertion unit disposed on a traveling path of the first light, such that a light path of the first light is identical to a focal length of the convex lens.

17. The optical artificial neural network system of claim 15, wherein a first quarter wave-plate disposed between the light Fourier transform device and the second spatial light modulator, wherein a distance between the convex lens and the second spatial light modulator is determined in consideration of a refractive index of the first quarter wave-plate disposed on a traveling path of the second light, such that a light path of the second light is identical to a focal length of the convex lens.

18. An optical artificial neural network system comprising:

a light insertion unit configured to receive an incident light;

a first spatial light modulator configured to modulate the incident light received by the light insertion unit to generate a first light having a first optical image;

a first light path adjustment device configured to change the light path of the first light;

a second light path adjustment device configured to circularly polarize the first light passing through the first light path adjustment device;

a light Fourier transform device configured to reflect the first light circularly polarized, to generate a second light having a second optical image; and a second spatial light modulator configured to modulate the second light to generate a third light having a third optical image, wherein the second light generated by the light Fourier transform device travels to the second spatial light modulator through the second light path adjustment device, wherein the third light generated by the second spatial light modulator travels to the light Fourier transform device through the second light path adjustment device, wherein the light Fourier transform device is configured to reflect the third light to generate a fourth light having a fourth optical image, and wherein the first light path adjustment device is configured to transmit the fourth light, wherein the light Fourier transform device includes a concave mirror, and wherein the second spatial light modulator is arranged so as to be perpendicular to an optical axis of the light Fourier transform device.

* * * * *